(12) United States Patent
Kobayashi

(10) Patent No.: US 7,290,444 B2
(45) Date of Patent: Nov. 6, 2007

(54) MEASUREMENT OBJECT FOR WIND TUNNEL TEST

(75) Inventor: Masaki Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/268,509

(22) Filed: Nov. 8, 2005

(65) Prior Publication Data

US 2006/0101906 A1    May 18, 2006

(30) Foreign Application Priority Data

Nov. 9, 2004    (JP) .............................. 2004-324934

(51) Int. Cl.
*G01L 9/00* (2006.01)
(52) U.S. Cl. .................................. 73/170.01
(58) Field of Classification Search .................. 73/147, 73/180, 170.01
See application file for complete search history.

(56) References Cited

U.S. PATENT DOCUMENTS

| | | | |
|---|---|---|---|
| 5,186,046 A * | 2/1993 | Gouterman et al. | 73/147 |
| 5,341,676 A * | 8/1994 | Gouterman et al. | 73/147 |
| 5,854,682 A * | 12/1998 | Gu | 356/426 |
| 2005/0115331 A1 * | 6/2005 | Fonov et al. | 73/800 |
| 2005/0288475 A1 * | 12/2005 | Hamner | 528/44 |

FOREIGN PATENT DOCUMENTS

| | | |
|---|---|---|
| JP | 7-12661 A | 1/1995 |
| JP | 2002-228524 A | 8/2002 |

* cited by examiner

*Primary Examiner*—Andre J. Allen
(74) *Attorney, Agent, or Firm*—Birch, Stewart, Kolasch & Birch, LLP

(57) ABSTRACT

A pressure sensitive paint is applied to the surface of a measurement object main body of a wind tunnel and is irradiated with an excitation light from a luminescent sheet and excited to generate phosphorescence so that an intensity of the phosphorescence that corresponds to the pressure on the surface of the measurement object main body can be measured to determine a pressure distribution on the surface. The luminescent sheet is disposed within the measurement object main body made of a light transmitting material. The entirety of the pressure sensitive paint can be uniformly irradiated with the excitation light without applying the excitation light from a plurality of light sources disposed outside the measurement object main body, thereby enhancing the accuracy with which the pressure distribution is measured. The flexible luminescent sheet conforms to the shape of the three-dimensional curved surface of the measurement object main body.

20 Claims, 3 Drawing Sheets

MEASUREMENT OBJECT FOR WIND TUNNEL TEST

CROSS-REFERENCE TO RELATED APPLICATIONS

The present application claims priority under 35 USC 119 to Japanese Patent Application No. 2004-324934 filed on Nov. 9, 2004, the entire content of which is hereby incorporated by reference.

BACKGROUND OF THE INVENTION

1. Field of the Invention

The present invention relates to a measurement object for use in a wind tunnel test that includes a measurement object main body and a pressure sensitive paint applied on a surface of the measurement object main body. A light source irradiating excitation light is illuminated on the pressure sensitive paint and excites the pressure sensitive paint to generate phosphorescence so that an intensity of phosphorescence that varies according to pressure on the surface of the measurement object main body can be measured to determine a pressure distribution on the surface of the measurement object main body.

2. Description of Related Art

When a pressure sensitive paint applied to the surface of an object is irradiated with an excitation light, the intensity of phosphorescence emitted from the pressure sensitive paint changes according to the amount of oxygen molecules impinging on the phosphorescence. More specifically, the phosphorescence emitted is dependent on the pressure of air coming into contact with the pressure sensitive paint. Based on this finding, Japanese Patent Application Laid-open No. 7-12661 discloses a technique for measuring a pressure distribution (flow rate distribution) by measuring the intensity of phosphorescence.

In addition, Japanese Patent Application Laid-open No. 2002-228524 also discloses a technique in which a pressure detection sheet includes a pressure sensitive paint layer, a surface transparent electrode, a light emitting layer, an insulating layer, a back electrode, a back protective layer, and an adhesive layer that is affixed to the surface of a detection object. An excitation light generated by energizing the light emitting layer is applied to the pressure sensitive paint layer to generate phosphorescence. The intensity of phosphorescence is measured to determine a pressure distribution (flow rate distribution) on the surface of the detection object.

However, in the arrangement disclosed in Japanese Patent Application Laid-open No. 7-12661, since the pressure sensitive paint applied to the surface of the object is irradiated with an excitation light from outside of the object, it is necessary to employ a plurality of light sources in order to irradiate the entire surface of the pressure sensitive paint with excitation light. This results not only in an increase in the size of the entire system but also in a problem that it is difficult to uniformly irradiate the entire surface of the pressure sensitive paint with excitation light so that measurement errors are easily generated.

In addition, in the arrangement disclosed in Japanese Patent Application Laid-open No. 2002-228524, creases are inevitably generated when the pressure detection sheet including multiple layers is affixed to the surface of the detection object having a three-dimensional curved surface. The creases disadvantageously affect the airflow on the surface of the detection object, and give unevenness to the irradiation of the excitation light to the pressure sensitive paint layer.

SUMMARY OF THE INVENTION

An object of an embodiment of the present invention is to provide a measurement object for a wind tunnel test for measuring a pressure distribution using a pressure sensitive paint, wherein irradiation of excitation light to the pressure sensitive paint can be simply and reliably carried out.

In order to achieve the above object, according to a first feature of the present invention, there is provided a measurement object for a wind tunnel test, that includes a measurement object main body with a pressure sensitive paint applied on a surface of the measurement object main body. A light source is provided for irradiating an excitation light on the pressure sensitive paint and exciting the pressure sensitive paint to generate phosphorescence so that an intensity of phosphorescence, that varies according to pressure on the surface of the measurement object main body, can be measured to determine a pressure distribution on the surface of the measurement object main body. The light source is made of a light transmitting material and is disposed within the measurement object main body.

With the first feature of the present invention, when the pressure sensitive paint applied to the surface of the measurement object main body is irradiated with an excitation light from the light source and excited to generate phosphorescence, the intensity of phosphorescence that corresponds to the pressure on the surface of the measurement object main body is measured to determine a pressure distribution on the surface of the measurement object main body. Since the light source is disposed within the measurement object main body made of the light transmitting material, the entirety of the pressure sensitive paint can be uniformly irradiated with the excitation light without applying the excitation light from a plurality of light sources disposed at a plurality of positions outside the measurement object main body, thereby enhancing the accuracy with which the pressure distribution is measured.

According to a second feature of the present invention, the light source comprises a luminescent sheet that includes a flexible transparent sheet and a plurality of luminous bodies embedded within the flexible transparent sheet.

With the second feature of the present invention, the light source comprises the luminescent sheet including the flexible transparent sheet and the plurality of luminous bodies embedded within the flexible transparent sheet. Therefore, it is possible to easily mount the flexible luminescent sheet on the measurement object main body so that the flexible luminescent sheet conforms to the shape of the three-dimensional curved surface of the measurement object main body, while disposing the plurality of luminous bodies at uniform intervals and allowing excitation light from the luminous bodies to penetrate through the transparent sheet so that the pressure sensitive paint is irradiated therewith.

According to a third feature of the present invention, the luminescent sheet is disposed along an inner wall face of the measurement object main body which is hollow, and the inside of the luminescent sheet is filled with a filling member.

With the third feature of the present invention, since the luminescent sheet is disposed along the inner wall face of the hollow measurement object main body and the inside thereof is filled with the filling member, it is possible to prevent displacement or detachment of the luminescent sheet by restraining the position thereof by means of the filling member.

A model main body 11 of an embodiment corresponds to the measurement object main body of the present invention, a luminescent sheet 12 of the embodiment corresponds to the light source of the present invention, a transparent silicone base 17 of the embodiment corresponds to the transparent sheet of the present invention, and a light emitting diode 19 of the embodiment corresponds to the luminous body of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENT

Figure 1:
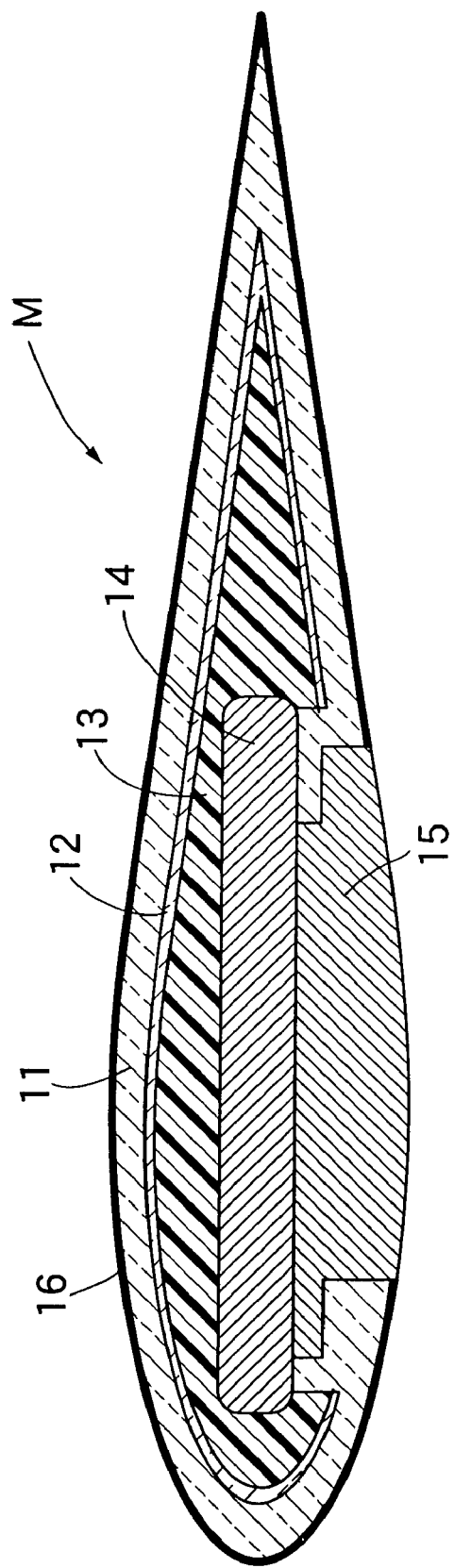
FIG. 1 is a sectional view of a wing model for a wind tunnel test.

As shown in FIG. 1, a wind tunnel test model M of an airplane main wing includes a hollow model main body 11 molded from an epoxy resin with a predetermined thickness so as to have a wing-shaped cross section. A luminescent sheet 12 is disposed along an inner wall face of the model main body 11. A filling member 13, which is made of a low repulsion urethane material, fills the inside of the luminescent sheet 12. A frame 14 is made of metal and extends through the interior of the filling member 13 in the span direction. A support member 15 is fixed to a lower face of the frame 14 and is connected to a six-component force measurement system, etc. (not illustrated).

The model main body 11 is molded by a known stereolithographic method, and is formed by sequentially molding in the span direction wing-shaped segments having a predetermined thickness. The model main body 11, which is made of a transparent epoxy resin, is capable of transmitting light, and has a surface coated with a porphyrin-based, Lu complex-based, aromatic-based, etc. pressure sensitive paint 16.

Figure 2:
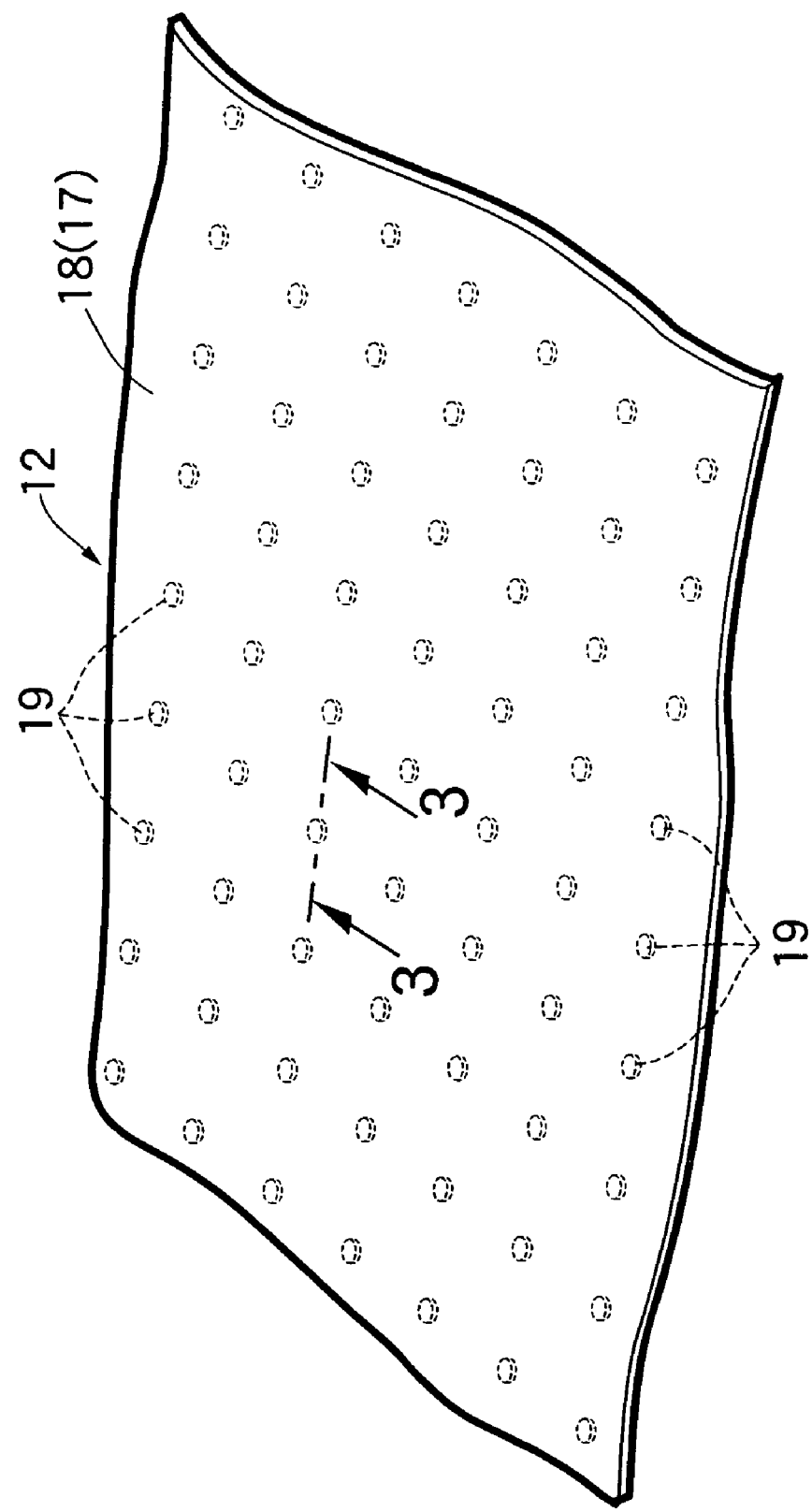
FIG. 2 is a partial perspective view of a luminescent sheet.
Figure 3:
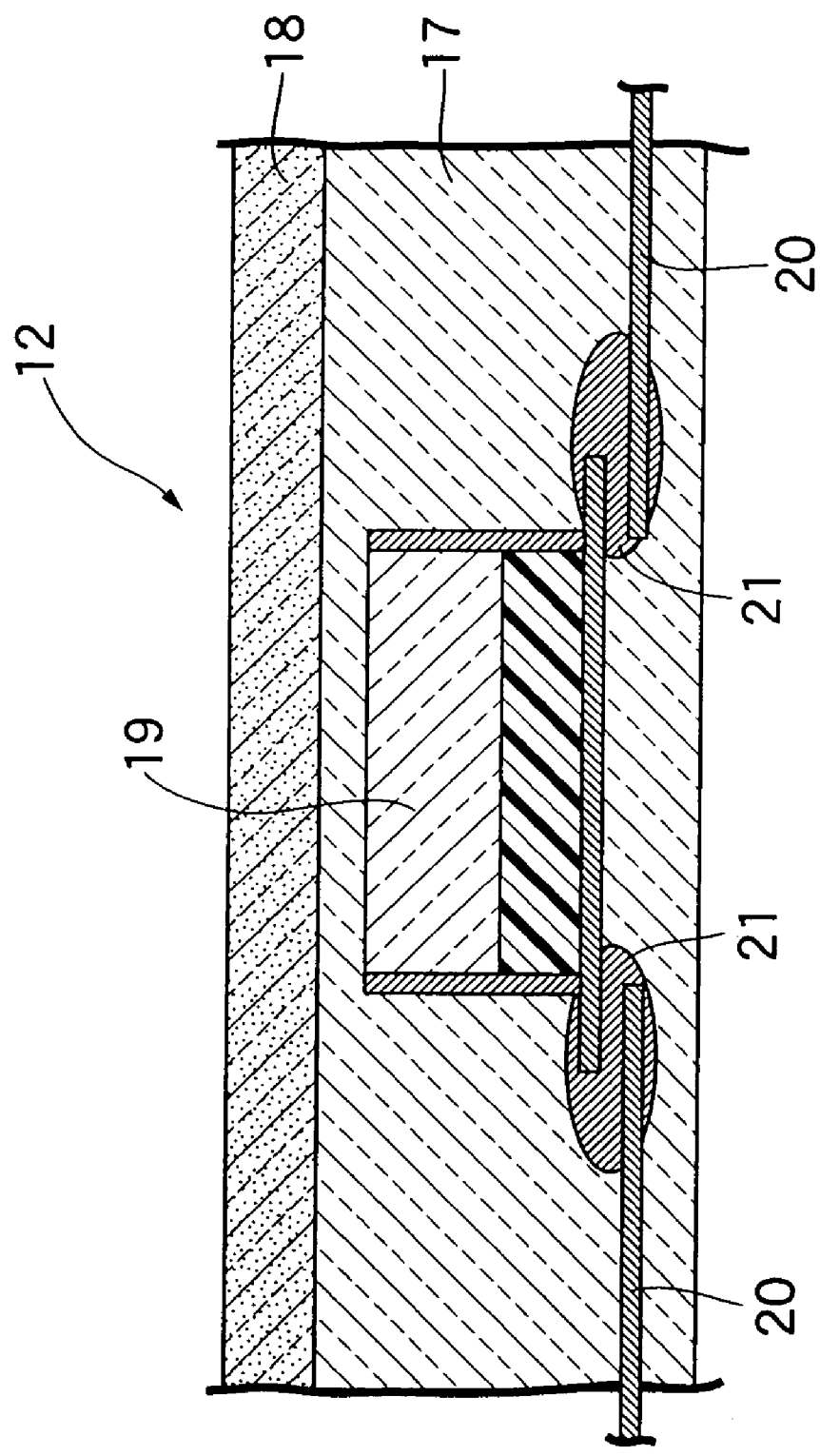
FIG. 3 is an enlarged sectional view along line 3-3 in FIG. 2.

As shown in FIG. 2 and FIG. 3, the luminescent sheet 12 includes a flexible transparent silicone base 17 with a light diffusion layer 18 of silicon, etc. layered on the surface side of the transparent silicone base 17 (model main body 11 side). A large number of light emitting diodes 19 are disposed in a lattice formed within the transparent silicone base 17. Wiring 20, that is formed from copper wire, an etching pattern, or a conductive polymer, is provided on the reverse side of the transparent silicone base 17 with the wiring 20 being joined to terminals of the light emitting diodes 19 via joints 21 formed by soldering or the like.

When the luminescent sheet 12 is disposed along the inner wall face of the model main body 11 having a three-dimensional curved surface, the flexible luminescent sheet 12 can follow the surface while expanding or contracting, thereby preventing creases from occurring. By employing as the wiring 20 expandable flexible wiring, it is possible to prevent expansion and contraction of the luminescent sheet 12 from being inhibited. Since the space between the inner face (reverse surface) of the luminescent sheet 12 and the frame 14 is filled with the filling member 13 made of the low repulsion urethane material, the luminescent sheet 12 is sandwiched between the model main body 11 and the filling member 13, thereby preventing displacement and detachment of the luminescent sheet 12.

The operation of the embodiment of the present invention having the above-mentioned arrangement is now explained.

The wind tunnel test model M is supported within a wind tunnel by the support member 15, and the light emitting diodes 19 is energized via the wiring 20, so that ultraviolet or blue excitation light is emitted. This excitation light penetrates the transparent silicone base 17, is then diffused uniformly by the light diffusion layer 18 made of silicon, etc. and layered on the outer face side (model main body 11 side) of the transparent silicone base 17, penetrates the model main body 11 made of the transparent epoxy resin, and irradiates the pressure sensitive paint 16 from inside.

The pressure sensitive paint 16 is irradiated with excitation light and emits blue or red phosphorescence together with fluorescence, the phosphorescence impinges on oxygen molecules which absorb energy of the phosphorescence, and the intensity of the phosphorescence is decreased. During this process, air flowing through the wind tunnel acts on the wind tunnel test model M, forming a pressure distribution according to a flow rate of air on the surface thereof. Since the oxygen concentration on the surface of the pressure sensitive paint 16 changes according to the level of pressure of the air, the decrease in phosphorescence intensity is large in a section where the pressure is high (section where the oxygen concentration is high), and the decrease in phosphorescence intensity is small in a section where the pressure is low (section where the oxygen concentration is low). Therefore, by photographing the phosphorescence on the surface of the wind tunnel test model M by means of a CCD camera, etc. so as to measure the intensity thereof, it is possible to determine a pressure distribution on the surface, that is, a flow rate distribution.

As described above, since the luminescent sheet 12, which is the light source, is disposed within the wind tunnel test model M, the entire region of the pressure sensitive paint 16 applied to the surface of the model main body 11 can be irradiated uniformly with an excitation light without applying the excitation light from a plurality of light sources disposed outside the wind tunnel test model M, thereby enhancing the accuracy with which a pressure distribution is measured. In particular, since the luminescent sheet 12 is disposed within the wind tunnel test model M, not only is it suitable for a large wind tunnel in which it is difficult for excitation light to reach from the outside, but it is also suitable for a concave-shaped wind tunnel test model M which easily forms a shadow when an external light source is used. Moreover, employing the light emitting diodes 19 can save electric power.

Furthermore, since the luminescent sheet 12, with which the pressure sensitive paint 16 is irradiated, is formed by disposing the large number of light emitting diodes 19 within the flexible transparent silicone base 17, it is possible to eliminate uneven irradiation by arranging the plurality of light emitting diodes 19 at uniform intervals, and prevent creases from occurring by making the flexible transparent silicone base 17 conform to the three-dimensional curved surface of the inner wall face of the model main body 11, thus improving the ease of mounting and further reducing uneven irradiation. Moreover, since the inside of the luminescent sheet 12, disposed along the hollow inner wall face of the model main body 11, is filled with the filling member 13, the position of the luminescent sheet 12 can be restrained by the filling member 13, thereby preventing it from being displaced.

Although an embodiment of the present invention is explained above, the present invention is not limited to the above-mentioned embodiment, and can be modified in a variety of ways without departing from the subject matter of the present invention.

For example, an electronic shutter comprising a liquid crystal sheet can be layered on the surface of the light diffusion layer 18 of the luminescent sheet 12 to control transmission and blockage of an excitation light between the light emitting diodes 19 and the pressure sensitive paint 16. By so doing, it is possible to prevent the pressure sensitive paint 16 from being unnecessarily exposed to excitation light, while stabilizing the luminescent state of the luminescent sheet 12 by constantly turning it on, thereby preventing degradation of the pressure sensitive paint 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A measurement object for a wind tunnel test, comprising:
    a measurement object main body; and
    a pressure sensitive paint applied on a surface of the measurement object main body;
    a light source irradiating an excitation light to the pressure sensitive paint and exciting the pressure sensitive paint to generate phosphorescence so that an intensity of phosphorescence that varies according to pressure on the surface of the measurement object main body can be measured to determine a pressure distribution on the surface of the measurement object main body,
    wherein the light source is made of a light transmitting material and disposed within the measurement object main body.

2. The measurement object for a wind tunnel test according to claim 1, wherein the light source comprises a luminescent sheet including a flexible transparent sheet and a plurality of luminous bodies embedded within the flexible transparent sheet.

3. The measurement object for a wind tunnel test according to claim 2, wherein the pressure sensitive paint is disposed along an outer wall face of the measurement object main body, the luminescent sheet of the light source is disposed along an inner wall face of the measurement object main body which is hollow, and a filling member is disposed along an inner side of the luminescent sheet.

4. The measurement object for a wind tunnel test according to claim 2, wherein the plurality of luminous bodies are arranged in a predetermined lattice pattern in the flexible transparent sheet, and are spaced a predetermined distance relative to each other.

5. The measurement object for a wind tunnel test according to claim 2, wherein the flexible transparent sheet is formed of a flexible transparent silicone base with a light diffusion layer formed thereon.

6. The measurement object for a wind tunnel test according to claim 5, wherein the light diffusion layer is silicon.

7. The measurement object for a wind tunnel test according to claim 4, and further including an electrical connector being provided for operatively connecting the plurality of luminous bodies relative to each other.

8. The measurement object for a wind tunnel test according to claim 7, wherein the electrical connector is selected from the group consisting of a copper wire, an etched pattern and a conductive polymer.

9. The measurement object for a wind tunnel test according to claim 3, wherein the filling material is a low repulsion urethane material.

10. The measurement object for a wind tunnel test according to claim 1, wherein the light transmitting material is flexible and conforms to a three-dimensional shape of the measurement object main body.

11. A system for measuring an object in a wind tunnel test, comprising:
    a pressure sensitive paint adapted to be applied on a surface of a measurement object main body;
    a light source adapted to be positioned within the measurement object main body for irradiating an excitation light to the pressure sensitive paint and exciting the pressure sensitive paint to generate phosphorescence so that an intensity of phosphorescence that varies according to pressure on the surface of the measurement object main body can be measured to determine a pressure distribution on the surface of the measurement object main body, said light source being made of a light transmitting material.

12. The system for measuring an object in a wind tunnel test according to claim 11, wherein the light source comprises a luminescent sheet including a flexible transparent sheet and a plurality of luminous bodies embedded within the flexible transparent sheet.

13. The system for measuring an object in a wind tunnel test according to claim 12, wherein the luminescent sheet of the light source is sandwiched between an inner wall face of the measurement object main body and a filling member which fills a hollow portion of the measurement main body inside of the luminescent sheet.

14. The system for measuring an object in a wind tunnel test according to claim 12, wherein the plurality of luminous bodies are arranged in a predetermined lattice pattern in the flexible transparent sheet, and are spaced a predetermined distance relative to each other.

15. The system for measuring an object in a wind tunnel test according to claim 12, wherein the flexible transparent sheet is formed of a flexible transparent silicone base with a light diffusion layer formed thereon.

16. The system for measuring an object in a wind tunnel test according to claim 15, wherein the light diffusion layer is silicon.

17. The system for measuring an object in a wind tunnel test according to claim 14, and further including an electrical connector being provided for operatively connecting the plurality of luminous bodies relative to each other.

18. The system for measuring an object in a wind tunnel test according to claim 17, wherein the electrical connector is selected from the group consisting of a copper wire, an etched pattern and a conductive polymer.

19. The system for measuring an object in a wind tunnel test according to claim 13, wherein the filling material is a low repulsion urethane material.

20. The system for measuring an object in a wind tunnel test according to claim 11, wherein the light transmitting material is flexible and conforms to a three-dimensional shape of the measurement object main body.

* * * * *